United States Patent Office 2,706,321
Patented Apr. 19, 1955

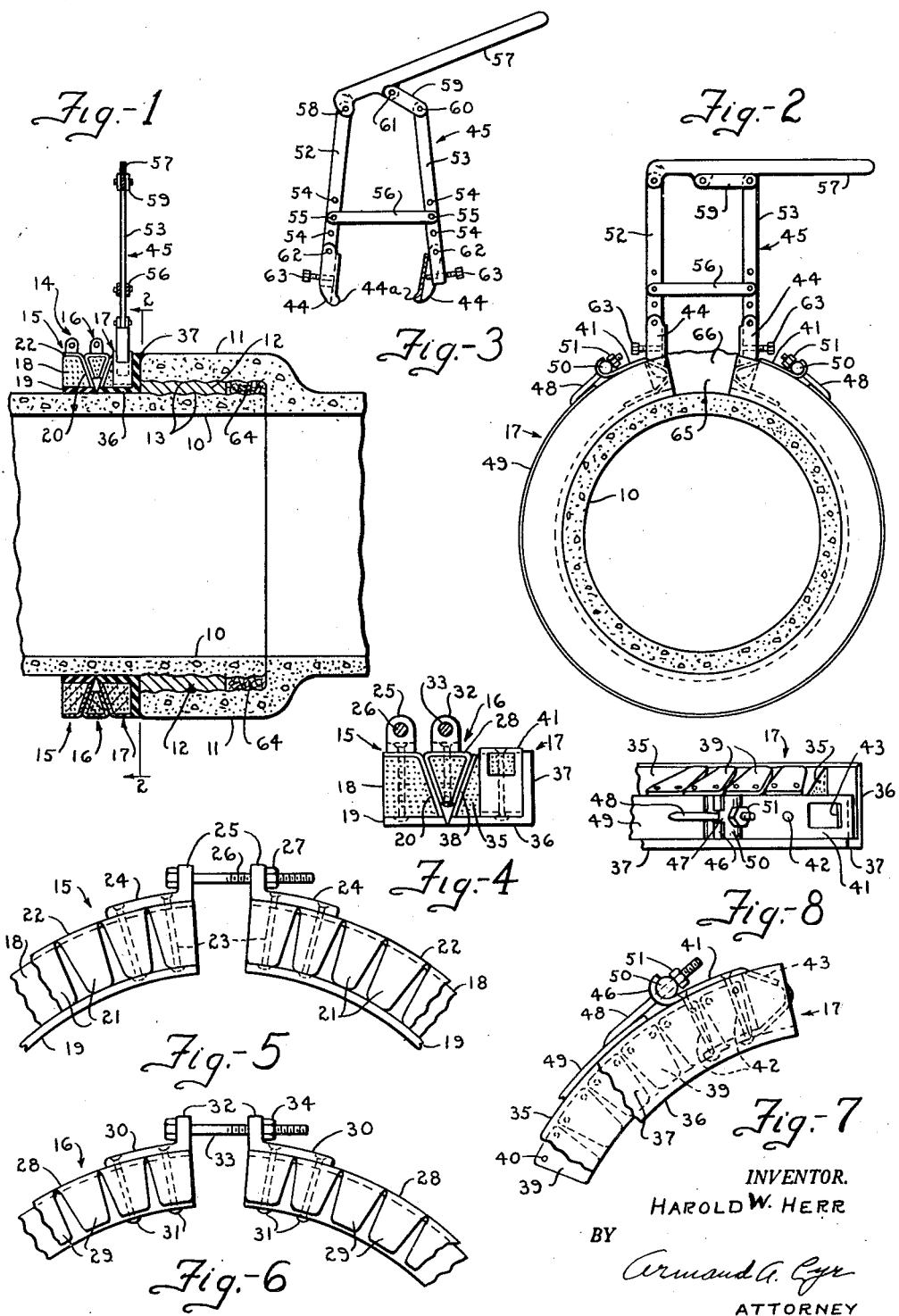

2,706,321

PIPE JOINT RUNNER

Harold W. Herr, Gary, Ind.

Application June 28, 1952, Serial No. 296,218

8 Claims. (Cl. 25—127)

This invention relates to improvements in pipe jointers or runners, and more particularly to an improved clamping assembly for use in quickly and effectively sealing the overlapping portions of water pipes, sewer pipes, soil pipes or the like, while permitting molten lead, tar, asphalt, asphaltum or the like to be poured into and around the pipe joint.

Under present practice in assembling sections of sewer pipe, the spigot end of one section of pipe is inserted into the bell end of an adjoining section and following this operation, oakum or the like is caulked in the bell around the spigot end. Then, a conventional runner consisting of a large cord or rope made of strands of fibre braided together is partially wrapped around the spigot end portion of the pipe adjacent the outer end of the bell, leaving an opening near the top surface of the spigot pipe to allow asphalt or the like to be poured into said opening. This rope is pushed by hand against the outer end of the bell and thence clay or a similar substance is packed against the rope in an effort to perfect the seal at the outer end of the bell and around the periphery of the spigot.

In addition to the clay that is packed against the runner, it is often necessary to fill the trench with sand or the like adjacent the joint and to pack this sand over the clay to insure a leak-proof joint while the asphaltum is poured into the joint. To install a runner of this type requires the services of at least two men who must pull the rope against the periphery of the spigot and then, with the free ends of the rope in vertical position above the pipes, secure those ends with wire or the like to prevent the rope from becoming loosened from the pipe. This allows an opening between the joint where the free ends of the rope are secured and the spigot, through which the asphaltum is poured into the joint. Following this operation, these workmen then use a hammer or other instrument to force the rope snug against the bell end of the adjacent pipe. After the asphalt or the like has been poured into the space between the spigot and the bell, the runner must be left on the pipe for at least one hour to allow the asphalt to set. When lead is used, the setting period is much shorter. In any event, once the sealing material has set, it then becomes necessary to remove the sand, then the clay or other packing material from around the runner, and then remove the runner for use in sealing another section of pipe. This conventional operation in applying and removing runners on sewer pipes takes anywhere from one hour to an hour and thirty minutes to complete the sealing of each pipe joint.

It is the primary object of my invention to provide a novel pipe runner that may be quickly and easily applied to pipe joints of this character and at the same time form an effective seal during the asphalt pouring operation.

Another object is to furnish a pipe runner that may be quickly and readily removed from a pipe joint and easily transported to the next pipe joint to be sealed.

A still further object is to provide a pipe jointer or runner that may be readily installed and removed in substantially less time than is now required in the use of the conventional pipe jointer or runner above described.

Another object is to provide a pipe runner or jointer having novel clamping means that will insure a tight seal around the periphery of the spigot pipe while at the same time providing a leak-proof joint between the outer end of the bell and the runner.

With the foregoing objects outlined and with other objects in view which will appear as the description proceeds, my invention consists in the novel features hereinafter described in detail, illustrated in the accompanying drawing, and more particularly pointed out in the appended claims.

In the drawing:

Figure 1 is a longitudinal sectional view of my improved pipe runner showing the same applied to adjoining sections of sewer pipe.

Figure 2 is a vertical sectional view taken on the line 2—2 of Figure 1.

Figure 3 is a front elevation of my clamping member.

Figure 4 is an enlarged view of the ends of the three clamping bands shown in Figure 1 without the clamping member attached thereon.

Figure 5 is a fragmentary side elevation of the outer clamping band shown in Figure 1.

Figure 6 is a fragmentary side elevation of the central clamping band.

Figure 7 is a fragmentary side elevation of the inner clamping band.

Figure 8 is a top plan view of the parts shown in Figure 7.

Referring to the drawing in detail, 10 designates the spigot end of a pipe while 11 represents the bell end of an adjacent pipe. The usual annular channel 12 is provided between the ends of the pipes, and the inner surface of the bell end and the outer surface of the spigot end may be corrugated or furrowed as shown at 13 for a purpose hereinafter described.

My improved pipe jointer or runner is shown generally at 14 in Figure 1, and comprises three clamping bands identified by the reference characters 15, 16 and 17 respectively. Each band is in the form of a split ring as shown in Figures 2, 5 and 6.

The main body portion 18 of the band 15 may be made of asbestos or composition rubber and fiber, with a layer 19 of neoprene or similar rubber-like resilient material secured to its inner surface by any suitable means such as adhesive or the like (not shown). If desired, the layer 19 may be formed integral with the body portion 18. One side edge of the body 18 is beveled as shown at 20 and substantially covered by a plurality of metal plates or discs 21 preferably formed integral with and depending from a thin metallic band 22 riveted, bolted or otherwise properly secured to the periphery of the body portion 18.

The adjacent ends of the band 15, as shown in Figure 5, each have secured thereto by means of bolts or rivets 23, a metal bracket or member 24, each bracket having an apertured ear 25 extending at right angles therefrom to receive a threaded bolt 26 for clamping the adjacent ends of the band toward one another. By tightening up on the nut 27 engaging the bolt 26, the band 15 is securely clamped about the spigot end 10 of the pipe to form a tight seal. The bolts or rivets 23 may be used to simultaneously clamp the metal band 22 and the metal member 24 to the body portion 18.

As may be clearly seen from Figures 1 and 4, the central clamping band 16 is of triangular or V shape in cross-section and acts as a wedge between the outer band 15 and the inner band 17. The band 16 is constructed of material similar to that of the body portion 18 of the band 15 and is provided with a thin metallic ring or band 28 that may be secured to its outer surface by suitable means such as bolts or rivets. Metal discs or plates 29 depend from the outer edges of the ring 28 and substantially cover the slanting side surfaces of the band 16. Like the band 15, the adjacent ends of the band 16 are also provided with clamping means in the form of metal members or plates 30 bolted or riveted thereto as shown at 31 and having apertured ears 32 facing each other to receive the clamping bolt 33. A nut 34 screw threaded on the bolt 33 serves to bring the adjacent ends of the band 16 toward one another and thus wedge the band 16 tightly between the outer and inner bands 15 and 17 respectively. Like the band 22 in Figure 5, the metallic band 28 in Figure 6 may be secured to the clamping ring 16 by the bolts or rivets 31.

The inner clamping ring 17, completing the clamping assembly is somewhat similar in construction to the outer ring 15, in that it has a body portion 35 of asbestos or composition rubber and fiber, and a layer 36 of neoprene or similar rubber-like resilient material secured to its inner surface. The layer 36, as shown at 37 in Figure 1, extends at right angles along one side edge of the ring 17 to engage the outer end of the bell pipe 11 when the runner is in sealing position. As will be noted, the opposite side edge 38 of this clamping ring slants outwardly toward the rings 15 and 16, and, like the ring 15, is also provided with metal plates or discs 39 substantially covering the entire beveled surface of the clamping ring 17. As shown in Figure 7, the plates or discs 39 are secured directly to the body portion 35 of the ring 17 by rivets 40 or the like.

In order to clamp the ring 17 around the end portion of the spigot end of the pipe, I provide plate members 41 encircling each end of the ring and secured thereto by bolts 42 (Figures 7 and 8). Each plate member is substantially U-shaped in cross section with the bend in the U of each member extending beyond the end of the ring 17 to which it is attached and having an aperture 43 to receive the adjustable fingers or pawls 44 of a clamping assembly indicated generally at 45 in Figure 3.

Each plate member 41 has one leg turned back to form a hook 46 having a slot 47 at its outer end to receive a bolt 48. One end of each bolt is anchored to a thin metallic band 49 covering the outer surface of the body portion 35 of a ring 17. A crosspiece 50 is slidably mounted on each bolt 48 and extends at right angles thereto for engagement in the hook members 46. The free end of each bolt 48 is threaded to receive a nut 51 for securely clamping the crosspiece 50 within the hook members and thereby pulling the metallic band 49 tightly around the body portion 35 of the ring 17.

The clamping assembly 45 comprises a pair of vertical legs 52, 53, each provided with vertically spaced apertures 54 to receive pins or bolts 55 for securing a cross bar 56 to said legs. A lever 57 is pivoted at one end to the upper end of the leg 52 as shown at 58.

A link 59 has one end pivotally connected to the upper end of the leg 53, as shown at 60, while its opposite end is pivotally connected to the lever 57 intermediate the ends of the latter as shown at 61. As clearly shown in Figure 3, the fingers or pawls 44 are pivotally mounted on the lower end portions of the legs 52 and 53 respectively, as indicated at 62, and are preferably made of metal casting in the form of an open trough, with the outer end of each pawl turned inwardly to form a hook 44a to engage the plate members 41 through the apertures 43.

In the use of my device, the spigot end 10 of the pipe is inserted in the bell 11 of an adjoining section of pipe. Oakum or similar packing 64 may then be caulked in place in the bell at the outer end portion of the spigot.

The split clamping bands or rings 15, 16 and 17 are preferably composed of flexible, elastic material, and the metallic bands covering the face of these rings are sufficiently thin and flexible to allow the rings to be opened wide enough for application to the spigot end of pipes of varying diameters.

In the application of my joint runner to the spigot end 10 of a sewer pipe or the like, I prefer to first install the clamping band or ring 17, forcing it as closely as possible against the bell end of the pipe 11. Following this operation, the clamping assembly 45 is installed on the band 17, with the pawls 44 engaging the apertures 43 in the metal members 41 on said band. The pawls can, of course, be adjusted to engage the metal members 41 on split rings of varying diameters, by means of the adjusting screws 63. After the assembly 45 is placed on the ring 17, the handle 57 is swung downwardly, to the position shown in Figure 2, thus forcing the two ends of the split ring 17 toward one another and compressing the ring firmly around the spigot 10, adjacent the end of the bell 11. The split ring 17 is of such diameter with respect to the diameter of the spigot pipe to be sealed, as to provide an opening 65 between the two ends of the ring after the aforesaid clamping operation, through which opening the asphaltum or the like is to be poured.

The split ring 15 is then installed on the spigot and forced as close as possible against the ring 17, thus leaving a substantially triangular space between the two rings to accommodate the ring 16. By tightening the nut 27 on the bolt 26, the two ends of the band 15 will be forced toward one another, thus firmly contracting the ring about the spigot 10.

The application of the runner to the pipe is completed by the installation of the ring 16 around the pipe, in the space between the rings 15 and 17. The two ends of the triangular shaped ring 16 are forced toward one another by tightening the nut 34 on the bolt 33, thus exerting a downward and lateral pressure against the rings 15 and 17. The metal plates 21 on the ring 15, plates 29 on two surfaces of the triangular ring 16, and plates 39 on the ring 17 minimize the resistance to relative motion between the ring 16 and the rings 15 and 17, thus permitting greater application of downward and lateral pressure through the ring 16 against the rings 15 and 17, and particularly the ring 17, to insure a tight seal between the latter and the end of the bell 11 and the outer surface of the spigot 10.

Because of irregularities in the surface of sewer pipes, soil pipes and the like to which my improved joint runner may be applied, I have provided an additional safeguard against the presence of crevices resulting from such irregularities through which the asphaltum, molten lead or similar sealing material might escape. By tightening the nuts 51 on the bolts 48 which are secured to the metallic band 49 on the split ring 17, the ring 17 is further compressed against the spigot 10, causing the neoprene or similar soft rubber layer 36 to fill these crevices and prevent leakage of sealing material.

Before pouring the asphaltum or the like through the opening 65 into the channel 12 formed between the spigot 10 and the bell 11, a dam of clay or similar substance 66 is built up in back of the opening 65 to prevent the sealing material from flowing toward the rings 16 and 15. Usually, some openings may be present between the two ends of the respective rings 16 and 15, and the clay dam may be built up in these openings.

After the sealing material has been allowed to set for a sufficient length of time, my improved joint runner may be readily dismantled and transported to another section of pipe to be sealed. It should be evident from the foregoing that considerable time and labor will be saved through the use of my device in lieu of the conventional devices and methods now employed for assembling and sealing sections of soil pipe, sewer pipe or the like.

While my invention has been shown and described in conjunction with the assembly of two pipe sections laid out in a horizontal position in a trench or the like, it will be understood that my improved pipe joint runner is also particularly applicable in the assembly of three or more pipe sections while such sections are in horizontal position outside the trench, with the spigot end of each section telescoped within the bell end of an adjacent section. In this manner, a plurality of pipe sections can be assembled and sealed prior to their laying in a trench for connection to other sections already located therein.

It will also be evident that while the metal plates 21 on the ring 15 and plates 29 on the ring 16 have been shown and described as formed integral with their respective metal bands 22 and 28, those plates may be secured in a manner similar to the plates 39 in Figure 8. In other words, the plates need not necessarily form a part of the thin metallic bands, but may be secured directly to the body portion of the respective clamping rings. Furthermore, these parts may be in the form of metal discs instead of plates.

From the foregoing it is believed that the construction, operation and advantages of my invention may be readily understood by those skilled in the art, and I am aware that many changes and modifications may be made in the embodiment of the invention herein described without departing from the spirit of the invention as expressed in the appended claims.

What I claim and desire to secure by Letters Patent is:

1. A pipe runner for use in sealing the spigot end of a pipe within the bell end of an adjacent pipe, comprising an inner, an outer, and an intermediate split clamping band, each composed of resilient compressible material and adapted to be placed in encircling position around the spigot pipe, the inner clamping band having one side wall adapted to abut against the outer end of the bell pipe, while its opposite side wall is beveled from its outer surface to its inner surface outwardly toward the outer clamping band, the outer clamping band having its inner side wall beveled from its outer surface to its inner surface inwardly toward the inner band, said outer and inner bands defining a substantially triangular space between them, the intermediate band being of substantially triangular shape in cross-section and adapted to substantially fill the space between the inner and outer bands, clamping means secured to the ends of the outer band and the intermediate band, respectively, for drawing the two ends of each band toward each other, and clamping means detachably mounted on the ends of the inner band for drawing said ends toward each other.

2. A pipe runner for use in sealing the spigot end of a pipe within the bell end of an adjacent pipe, comprising an inner, an outer, and an intermediate split clamping band, each composed of resilient compressible material and adapted to be placed in encircling position around the spigot pipe, the inner clamping band having one side wall adapted to abut against the outer end of the bell pipe, while its opposite side wall is beveled from its outer surface to its inner surface outwardly toward the outer clamping band, the outer clamping band having its inner side wall beveled from its outer surface to its inner surface inwardly toward the inner band, said outer and inner bands defining a substantially triangular space between them, the intermediate band being of substantially triangular shape in cross-section and adapted to substantially fill the space between the inner and outer bands, adjustable clamping means mounted on the ends of the inner and outer bands, respectively, for drawing the two ends of each band toward each other to tighten each band about the spigot pipe, and clamping means secured to the ends of the intermediate band for drawing the two ends of said band toward each other to force the intermediate band into engagement with the beveled surfaces of the inner and outer bands, and thereby forcing the inner band against the outer end of the bell pipe.

3. A pipe runner for use in sealing the spigot end of a pipe within the bell end of an adjacent pipe, comprising an inner, an outer, and an intermediate split clamping band, each band composed of resilient compressible material and adapted to be placed in encircling position around the spigot pipe, the inner clamping band having one side wall adapted to abut against the outer end of the bell, while its opposite side wall is beveled from its outer surface to its inner surface outwardly toward the outer clamping band, the outer clamping band having its inner side wall beveled from its outer surface to its inner surface inwardly toward the inner band, said outer and inner bands defining a substantially triangular space between them, the intermediate band being of substantially triangular shape in cross-section and adapted to substantially fill the space between the inner and outer bands, metal members secured to each end of each band, and adjustable means on each band connecting the metal members thereof for drawing the ends of each band toward each other to tighten each band about the spigot pipe.

4. A pipe runner for use in sealing the spigot end of a pipe within the bell end of an adjacent pipe, comprising an inner, an outer, and an intermediate split clamping band, each composed of resilient compressible material and adapted to be placed in juxtaposition around the spigot pipe, the inner clamping band having one side wall adapted to abut against the outer end of the bell pipe, while its opposite side wall is beveled from its outer surface to its inner surface outwardly toward the outer clamping band, the outer clamping band having its inner side wall beveled from its outer surface to its inner surface inwardly toward the inner band, said outer and inner bands defining a substantially triangular space between them, the intermediate band being of substantially triangular shape in cross-section and adapted to substantially fill the space between the inner and outer bands, metal members secured to each end of each band, apertured ears projecting at right angles from the metal members on two of said bands, means adjustably connecting the apertured ears on each band, respectively, for drawing the two ends of each of said last mentioned bands toward each other to tighten each band about the spigot pipe, and means on the metal members of the third band for drawing the two ends of the third band toward each other.

5. A pipe runner for use in sealing the spigot end of a pipe within the bell end of an adjacent pipe, comprising an inner, an outer, and an intermediate split clamping band, each composed of resilient compressible material and adapted to be placed in juxtaposition around the spigot pipe adjacent the outer end of a bell pipe, the inner clamping band having its outer side wall beveled from its outer surface to its inner surface outwardly toward the outer clamping band, the outer clamping band having its inner side wall beveled from its outer surface to its inner surface inwardly toward the inner band, said outer and inner bands forming a substantially triangular space between them, the intermediate band being of substantially triangular shape in cross-section and adapted to substantially fill the space between the inner and outer bands, a bracket secured to each end of the outer band, adjustable means connecting said brackets for drawing the ends of the outer band toward each other to tighten said band about the spigot pipe, a bracket secured to each end of the inner band, adjustable means on each of said last mentioned brackets for drawing the two ends of the inner band toward each other and compressing said inner band against the periphery of the spigot pipe.

6. A pipe runner as claimed in claim 4, wherein the abutting surfaces of the three bands are substantially covered with anti-friction material.

7. A pipe runner as claimed in claim 4, wherein the abutting surfaces of the three bands are substantially covered with anti-friction discs.

8. A pipe runner for use in sealing the spigot end of a pipe within the bell end of an adjacent pipe, comprising an inner, an outer, and an intermediate split clamping band, each composed of resilient compressible material and adapted to be placed in juxtaposition around the spigot pipe adjacent the outer end of a bell pipe, the inner clamping band having its outer side wall beveled from its outer surface to its inner surface outwardly toward the outer clamping band, the outer clamping band having its inner side wall beveled from its outer surface to its inner surface inwardly toward the inner band, said outer and inner bands forming a substantially triangular space between them, the intermediate band being of substantially triangular shape in cross-section and adapted to substantially fill the space between the inner and outer bands, a bracket secured to each end of the outer band, adjustable means connecting said brackets for drawing the ends of the outer band toward each other to tighten said band about the spigot pipe, a member secured to each end of the intermediate band, adjustable means connecting said members for drawing the ends of the intermediate band toward each other to press the intermediate band upon the beveled surfaces of the inner and outer bands, thereby forcing the inner band against the outer end of the bell pipe, an apertured bracket secured to each end of the inner band for drawing the two ends of the inner band toward each other to tighten said band about the spigot pipe, a split metallic ring loosely mounted on said inner band and substantially covering the perimeter thereof, a bolt fixed on each end of said ring, and means adjustably mounted on each of said bolts and adapted to engage the apertured brackets for drawing the ends of said ring toward each other for compressing the ring against said inner band.

References Cited in the file of this patent

UNITED STATES PATENTS

| | | |
|---|---|---|
| 960,604 | Vanderman | June 7, 1910 |
| 1,284,534 | Wyatt | Nov. 12, 1918 |
| 1,352,571 | Wyatt | Sept. 14, 1920 |
| 1,787,492 | Rasmussen | Jan. 6, 1931 |

FOREIGN PATENTS

| | | |
|---|---|---|
| 488,077 | Great Britain | June 30, 1938 |